United States Patent
Ohtsu

(10) Patent No.: US 7,478,324 B1
(45) Date of Patent: Jan. 13, 2009

(54) ELECTRONIC PUBLICATION SYSTEM

(76) Inventor: Shuichi Ohtsu, 66-3, Sayama New Town, 2520-192, Kashiwabara, Sayama-shi, Saitama-ken (JP)

(*) Notice: Subject to any disclaimer, the term of this patent is extended or adjusted under 35 U.S.C. 154(b) by 371 days.

(21) Appl. No.: 09/714,184

(22) Filed: Nov. 17, 2000

(30) Foreign Application Priority Data

Nov. 25, 1999 (JP) .............................. P-11-334896

(51) Int. Cl.
*G06F 17/00* (2006.01)
*G06F 11/00* (2006.01)
*H04K 1/00* (2006.01)

(52) U.S. Cl. .................. 715/255; 715/205; 715/234; 709/203; 726/26; 705/51

(58) Field of Classification Search ......... 709/201–203, 709/217; 707/502, 531, 501, 500; 345/200.49, 345/153, 615; 705/1–4, 51, 50, 57; 283/117; 715/530, 501.1, 526, 200, 205, 209, 234, 715/255, 256, 265, 743, 744, 745, 746, 760; 369/47.12, 47.1, 84; 726/2, 4, 21, 22, 26–30
See application file for complete search history.

(56) References Cited

U.S. PATENT DOCUMENTS

| | | | | |
|---|---|---|---|---|
| 5,509,074 A | * | 4/1996 | Choudhury et al. | 713/176 |
| 5,889,860 A | * | 3/1999 | Eller et al. | 705/51 |
| 5,963,968 A | * | 10/1999 | Warmus et al. | 715/517 |
| 6,253,216 B1 | * | 6/2001 | Sutcliffe et al. | 715/500 |
| 6,389,538 B1 | * | 5/2002 | Gruse et al. | 713/194 |
| 6,434,535 B1 | * | 8/2002 | Kupka et al. | 705/24 |
| 6,460,036 B1 | * | 10/2002 | Herz | 707/10 |
| 6,560,339 B1 | * | 5/2003 | Iwamura | 380/201 |
| 6,611,812 B2 | * | 8/2003 | Hurtado et al. | 705/26 |
| 6,751,598 B1 | * | 6/2004 | Yagawa et al. | 705/51 |
| 6,763,464 B2 | * | 7/2004 | Wang et al. | 713/193 |
| 6,766,454 B1 | * | 7/2004 | Riggins | 713/185 |
| 6,826,534 B1 | * | 11/2004 | Gupta et al. | 705/1 |
| 2002/0129094 A1 | * | 9/2002 | Reisman | 709/203 |

FOREIGN PATENT DOCUMENTS

| EP | 0567800 A1 | * | 4/1993 |
|---|---|---|---|
| EP | 0715246 A1 | * | 5/1996 |

OTHER PUBLICATIONS

Hal Berghel, Digital Village: Value-added Publishing, Jan. 1999, vol. 42, Issue 1, pp. 19-23.*
Van Slype, Copyright in Transmitted Electronic Documents (Cited), "Natural Language Version of the Generic Cited model," vol. I Sep. 1993.*

* cited by examiner

*Primary Examiner*—Doug Hutton
*Assistant Examiner*—Maikhanh Nguyen
(74) *Attorney, Agent, or Firm*—NDQ&M Watchstone LLP; Vincent M. DeLuca

(57) ABSTRACT

The composition of writing data is dynamically reedited from a registered group of writing data on the basis of the request contents of an individual reader, or the contents of the writing data are dynamically reedited from the registered group of writing data on the basis of the personal information of the reader, and the reedited writing data is provided to only the reader as a publication. The contents and configurations of an original to be published are dynamically reedited on the basis of the personal information and the request of the reader who is a user, and a publication having contents and a composition which are unique to the reader can be issued.

16 Claims, 9 Drawing Sheets

FIG. 6

| □ | 1 | YAMADA YOSHIKO | "INTRODUCTION OF WINDMILL" | ver. 1.02 | P.2 | 1999.11.14 |
|---|---|---|---|---|---|---|
| □ | 2 | SATO ICHIRO | "HIGH TECHNOLOGY OF WINDMILL" | ver. 2.00 | P.12 | 1998.12.14 |
| □ | 3 | NAKAMURA JIRO | "WORLD WINDMILL" | ver. 1.10 | P.8 | 1999.11.11 |
| □ | 4 | WATANABE SABURO | "MOVEMENT OF WINDMILL" | ver. 1.00 | P.16 | 1997.01.04 |
|   |   |   |   |   |   |   |
|   |   |   |   |   |   |   |
|   |   |   |   |   |   |   |

FIG. 7

¥input {"YAMADA YOSHIKO - INTRODUCTION OF WINDMILL-102-19991114. t×t"}

¥input {"WATANABE SABURO - MOVEMENT OF WINDMILL-100-19970104. t×t"}

FIG. 8

¥documentstyle[12pt]{tarticle}

¥begin{document}

¥input {"YAMADA YOSHIKO - INTRODUCTION OF WINDMILL-102-19991114. t×t"}

¥input {"WATANABE SABURO - MOVEMENT OF WINDMILL-100-19970104. t×t"}

¥end{document}

[BEFORE CONVERSION]

... I WONDER IF %READER NAME% HAVE. ACTUALLY SEEN REAL WIND GENERATOR ...

[AFTER CONVERSION]

... I WONDER IF YAMADA TARO HAVE ACTUALLY SEEN REAL WIND GENERATOR ...

ELECTRONIC PUBLICATION SYSTEM

CROSS REFERENCE TO RELATED APPLICATIONS

This patent application claims for benefit of the filing date of Japanese Patent Application No. P11-334896 filed on Nov. 25, 1999, the entire contents of which are hereby incorporated by reference.

BACKGROUND OF THE INVENTION

1. Field of the Invention

The present invention relates to an electronic publication system using an information network and, more particularly, to an electronic publication system which can prevent a publication from being illegally copied by performing edition depending a personal request of an individual reader or the personal information of the reader and can provide a publication conforming to personal needs.

2. Description of the Related Art

With the spreading of an information communication network represented by the Internet, personal computers, and printers having high resolutions, and the spreading of the document formats such as a PDF (Portable Document Format) which can realize print quality which is almost equal to that of typography, conditions for the spreading of electronic publication through networks have been composed.

In particular, the PDF can perform displaying on a display and printing from a printer without depending on a platform and requiring software and a font used when a PDF document is formed. In addition, the PDF has the following characteristic feature oriented to the electronic publication. That is, even though the document is enlarged and reduced, a fine layout can be kept, and multimedia information and an interactive device can be incorporated.

As a device for providing a required number of documents when the documents are necessary, on-demand printing is known. Since printed materials formed such that destinations of distribution are limited can be formed, excessive stocks are not required. The device achieves a structure which generates merits with a small lot for a short period of time to the deadline.

This on-demand printing provides fixed contents which are finished in advance to a user through a medium such as an electronic medium or a sheet of paper. However, "reeditable" which is the characteristic feature of electronic publication cannot be completely used at present.

As software for electronic publication developed by Voyager Corporation in the U.S.A. in 1992, Expanded book is known. This book is of such a type that pages are turned over by clicking a mouse like the paper design of a book, and is characterized to be applied to both the platforms of Windows and Macintosh. In recent years, as a new use for the Expanded book, a method called Net Expanded book in which the data of an Expanded book are distributed and browsed on the Internet has arrived.

However, this scheme has the following advantages. That is, the contents published with paper media are converted into data on electronic media such as CD-ROMs, an encyclopedia having an enormous volume can be made compact, and desired articles can be easily found out. However, the characteristic feature, i.e., "reeditable" which is held by the electronic publication cannot be completely used.

The characteristic feature, i.e., "reeditable" is not completely used because an advantage which is "reeditable" held by the electronic publication and an advantage that data can be easily copied and is not aged adversely amplify the danger of illegal copies to prevent the use of the capabilities held by the electronic publication.

As a technique for preventing a writings from being illegally copied, for example, an encoding technique disclosed in Japanese Unexamined Patent Publication No. 7-239828 or a visual watermarking technique is known. These techniques have achieved the protection of electronic publications.

However, even if these conventional illegal copy prevention techniques are used, these illegal copy prevention techniques are not determinant. The possibility that a technique for decoding encoded data, a technique for deleting a visual watermark, or the like appears cannot be denied. Actually, an encoding technique such as DES (data encryption standard) or RSA (Rivest-Shamir-Adleman scheme) may be decoded by a program installed in a personal computer or the like. Such an illegal copy prevention technique is caught in a so-called "vicious circle" on a side to be protected and a side to be decoded. As a result, an enormous labor and large funds cannot be held being invested in development of encoding techniques or the like.

Such a problem is raised in not only books such as a book and a magazine, but also other digital contents which creatively express spirits and emotions such as music, fine arts, movies, and computer programs.

In a conventional publication system, since writings are published in units of books or works, books in the field, such as a computer field, in which new techniques are continuously generated become old within a short period of time. For this reason, in order to cope with new techniques, a publisher must issue a reedition every time a new technique is developed. Even though one book is partially reedited, readers cannot help purchasing the reeditions if necessary.

In addition, for example, treatises or the like are issued for a relatively small constituency such as beginners, intermediate-level persons, or advanced-level persons. However, different readers need various pieces of information. The above divisions do not always conform to the needs of readers.

Furthermore, in order to obtain a certain piece of information, a user may have to obtain a large number of books. As a result, the obtained information often includes contents which partially overlap.

SUMMARY OF THE INVENTION

The present invention is made in consideration of the above problem.

More specifically, it is an object of the present invention to provide an electronic publication system which can issue publications having contents and composition which are unique to readers who are users.

In order to solve the above problem, an electronic publication system according to the present invention is characterized in that the composition of writing data is dynamically reedited from a registered group of writing data on the basis of the request contents of an individual reader to provide the reedited writing data as a publication to only the reader.

The second characteristic feature of an electronic publication system according to the present invention is to dynamically reedit the contents of writing data from a registered group of writing data on the basis of an individual reader on the basis of the personal information of the reader to provide the reedited writing data as a publication to only the reader.

According to the present invention, the contents and composition of an original serving as an object to be published are dynamically reedited on the basis of the personal information or request of a reader who is a user, and a publication having the contents and composition unique to the reader can be issued. Since the publication published in the manner has the contents and composition unique to the reader, the publication can be automatically prevented from being illegally copied without performing a special protection process such as encoding or visual watermarking to the publication. In addition, publications which conform to the needs of individual readers.

Other and further objects and features of this invention will be become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 6 is an image showing an example of searching results of writings obtained by a reader system.

FIG. 7 is an image showing an example obtained by performing an extraction/combination process for publications performed by the center system by using Tex.

FIG. 8 is an image showing an example obtained by performing a format setting process for a writings by the center system by using Tex.

DETAILED DESCRIPTION OF THE PREFERRED EMBODIMENTS

Embodiments of the present invention will be described below with reference to the accompanying drawings.

First Embodiment

Figure 1:
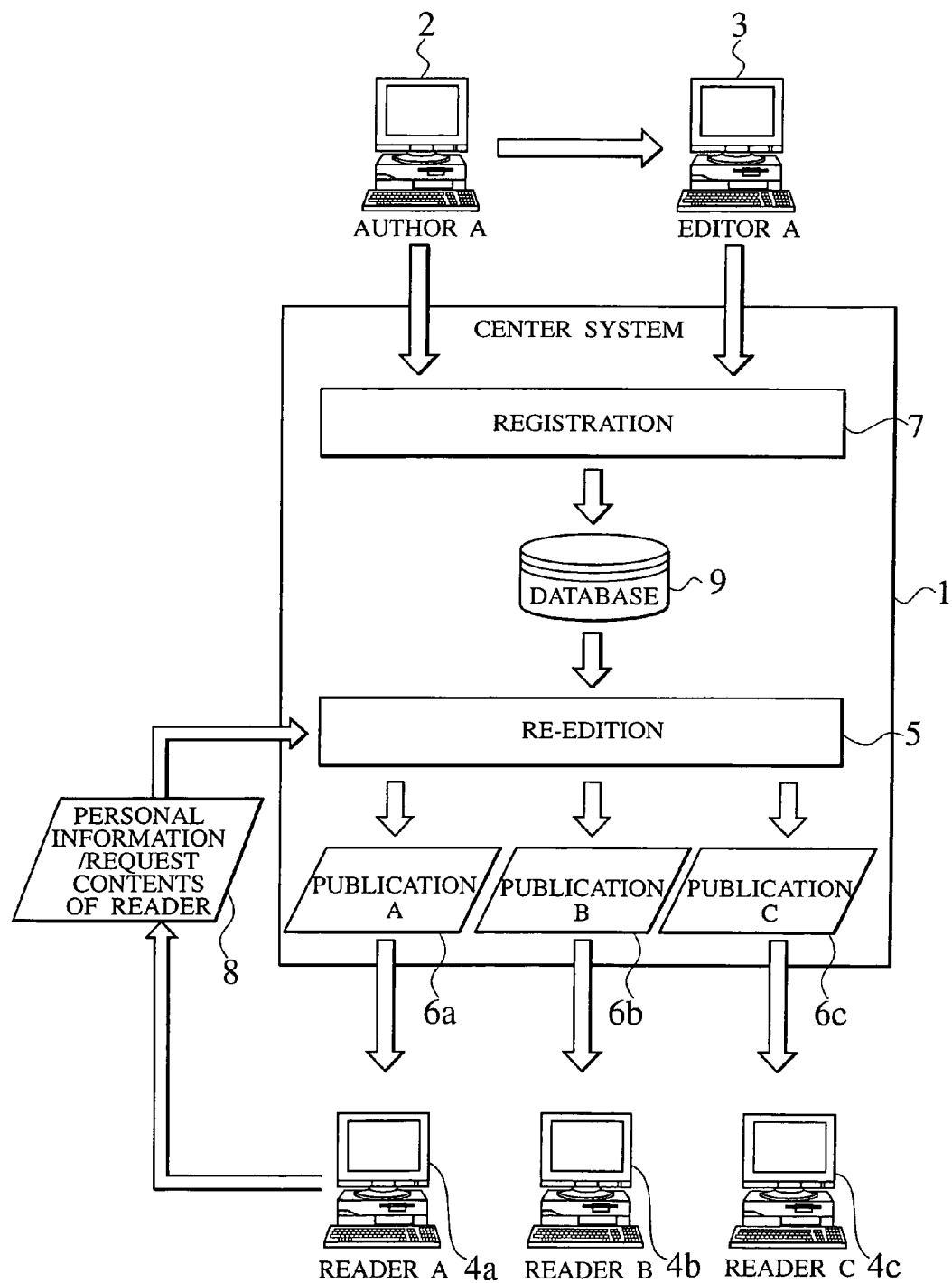
FIG. 1 is a schematic diagram showing an embodiment of an electronic publication system according to the present invention.

FIG. 1 is a schematic diagram showing an embodiment of an electronic publication system according to the present invention.

In FIG. 1, the electronic publication system according to the present invention is constituted by a center system 1 which edits and publishes a book, an author system 2, an editor system 3, and reader systems 4a to 4c. The author system 2, the editor system 3, and the reader systems 4a to 4c are arranged around the center system 1.

An author who is a writer of a publication sends writing data to the center system 1 by using the author system 2. At this time, the author may directly send the writing data to the center system 1, or the author may temporarily send the writing data to an editor and may send the writing data which is edited and processed by the editor to the center system 1 by using the editor system 3.

When the author or the editor registers writing data in the center system 1, the writing data need not be registered in units of books or works, and the writing data can be registered in units such as articles of a magazine, chapters of a book which are relatively finely divided.

The center system 1 which receives the writing data stores the writing data in a publication master 90 of a database 9 in the center system 1 and manages the writing data. As a matter of course, pieces of writing data of a plurality of authors are stored in the publication master 90.

On the other hand, a reader A who a purchaser of a book orders a book by using the reader system 4 held by the reader A. When the reader A orders the book, the reader A sends order information 8 constituted by the personal information of the reader and the request contents of the individual reader to the center system 1.

The center system 1 which receives the order information 8 displays a list of related writing data on the screen of the reader system 4 according to the request contents of the reader A.

The reader A further selects writings which are desired by the reader A from the list, and sends an edition request to the center system 1 by using the reader system 4.

The center system 1 which receives the edition request dynamically reedits the writing data constituted by the selected writings into one electronic book 6a while incorporating the personal information of the reader A. In this specification, this is called dynamic reedition.

The completed electronic book 6a has contents and composition which are most suitable for the reader A, and is only one in the world. In this case, it is important that an electronic publication 6a on which order information 8 of a reader A is reflected is provided to the reader A and that an electronic publication 6b on which order information 8 of a reader B is reflected is provided to the reader B and that an electronic publication 6c is similarly provided to a reader C.

These electronic publications 6a to 6c are sent to the readers A to C without being subjected to special copy protection such as encoding.

The electronic publications 6a to 6c have the contents and composition which are reedited according to the requests of the individual readers, and the pieces of personal information are incorporated in the electronic publications 6a to 6c, respectively. For this reason, even though it is technically possible to perform an illegal copy action such as distribution of copies to the third parties, the illegal action is suppressed from being performed.

More specifically, if the reader A gives a copy of the electronic publication 6a to the reader B, the contents and composition of the electronic publication 6a are necessary for the reader A, but are not always necessary for the reader B. In addition, since the personal information of the reader A is incorporated in the electronic publication 6a, the reader A does not want to illegally distribute the electronic publication 6a, and the reader B who is the third party does not want to illegally receive the electronic publication 6a.

The details of the systems constituting the electronic publication system according to the present invention will be described below with reference to the drawings.

Figure 2:
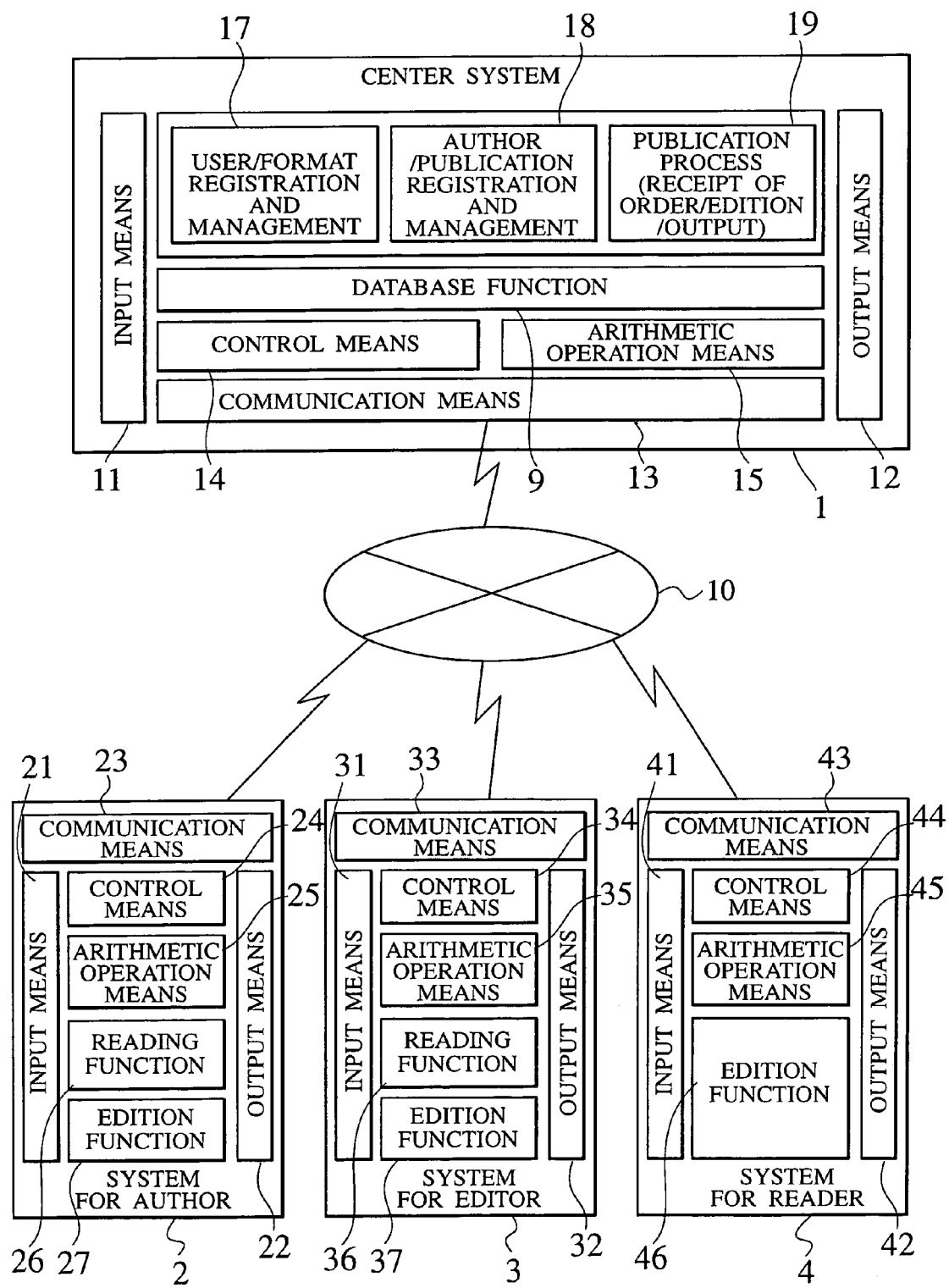
FIG. 2 is a block diagram showing a functional configuration of the electronic publication system shown in FIG. 1.

FIG. 2 is a functional block diagram of the electronic publication system according to the present invention shown in FIG. 1.

In FIG. 2, the center system 1, the author system 2, the editor system 3, and the reader system 4 are connected to a network 10.

This network 10 may be a world-wide network such as the Internet or a closed network such as a personal computer telecommunication.

The center system 1 comprises an input means 11, an output means 12, a communication means 13, and the database function 9. The operations of these functions are controlled by an arithmetic operation means 15 and a control means 14. As means for regulating these operations, a group of programs such as a dialogue function 17 to a reader, a dialogue function 18 to an author or an editor, and a publication process function 19 are held. The input means 11 and the output means 12 are to maintain the center system, and is constituted by an input device such as a keyboard or a mouse and an output device such as a monitor or a printer. The communication means 13 is a network connection device such as a modem or a terminal adaptor to be connected to the network 10.

As the database function 9, an RDBMS (Relational Database Management System) or an SQL (Structured Query Language) may be used. As the programs 17 to 19, software programs which do not depend on a platform and use Java may be used. As the formats of electronic publications published from the center system 1, the PDF format and the Expanded Book format which are described above or the HTML (Hypertext Markup Language) may be used.

The author system 2 will be described below next.

The author system 2 comprises an input means 21, an output means 22, and a communication means 23. The operations of these functions are controlled by an arithmetic operation means 25 and a control means 24.

The input means 21 is to write original data or to input the written original, and is constituted by a keyboard or a pointing device, a drive for reading a recording medium such as an floppy disk or a CD-ROM, and an input device such as a scanner. The output means 22 is constituted by an output device such as a monitor or a printer.

The communication means 23 is a network connection device such as a modem or a terminal adaptor which is required to be connected to the network 10.

As an edition function 27 for writing an original, text edition software such as a text editor or wordprocessor software is employed. As a reading function 26 for reading the obtained electric publication, browsing software such as a browser is employed.

These means are used not only for writing an original but also for dialogue between the center system 1 and the editor system 3. The format of an original sent from the author system 2 to the center system 1 or the editor system 3 may be a simple text format.

The configurations of the editor system 3 and the reader system 4 are basically the same as that of the author system 2, the reader system 4 does not always require an edition function. An edition function 37 of the editor system 3 is a function for further editing and processing the original data sent from the author and then sending the original data to the center system 1. The format of the original data sent from the editor system 3 to the center system 1 may be a simple text format as in the author system 2, or may be a file format such as the TeX format to add an edited form to the original data.

Figure 3:
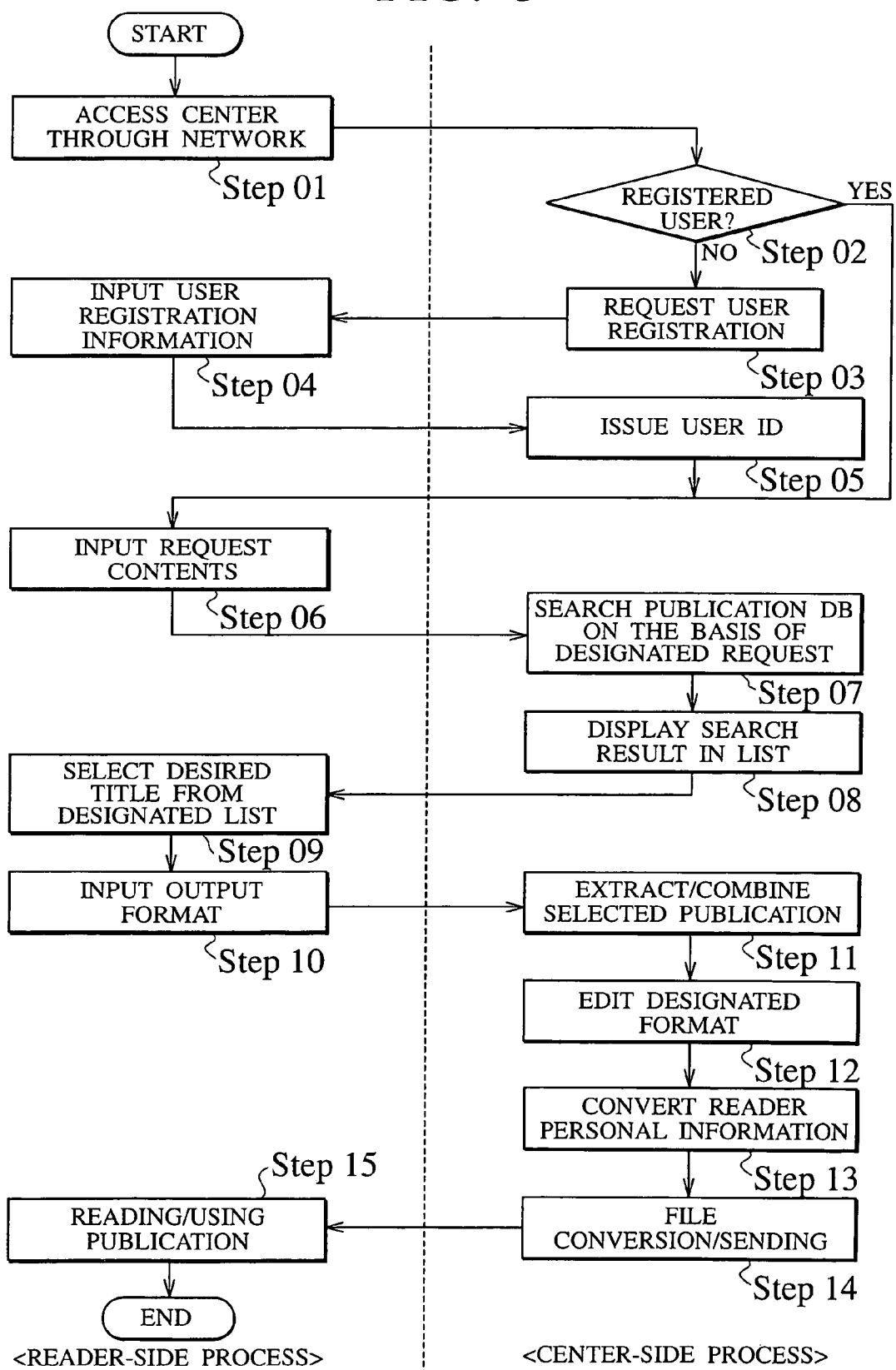
FIG. 3 is a flow chart showing an example of the procedure of a dialogue operation between a reader side and a center side in the electronic publication system according to the present invention.
Figure 4:
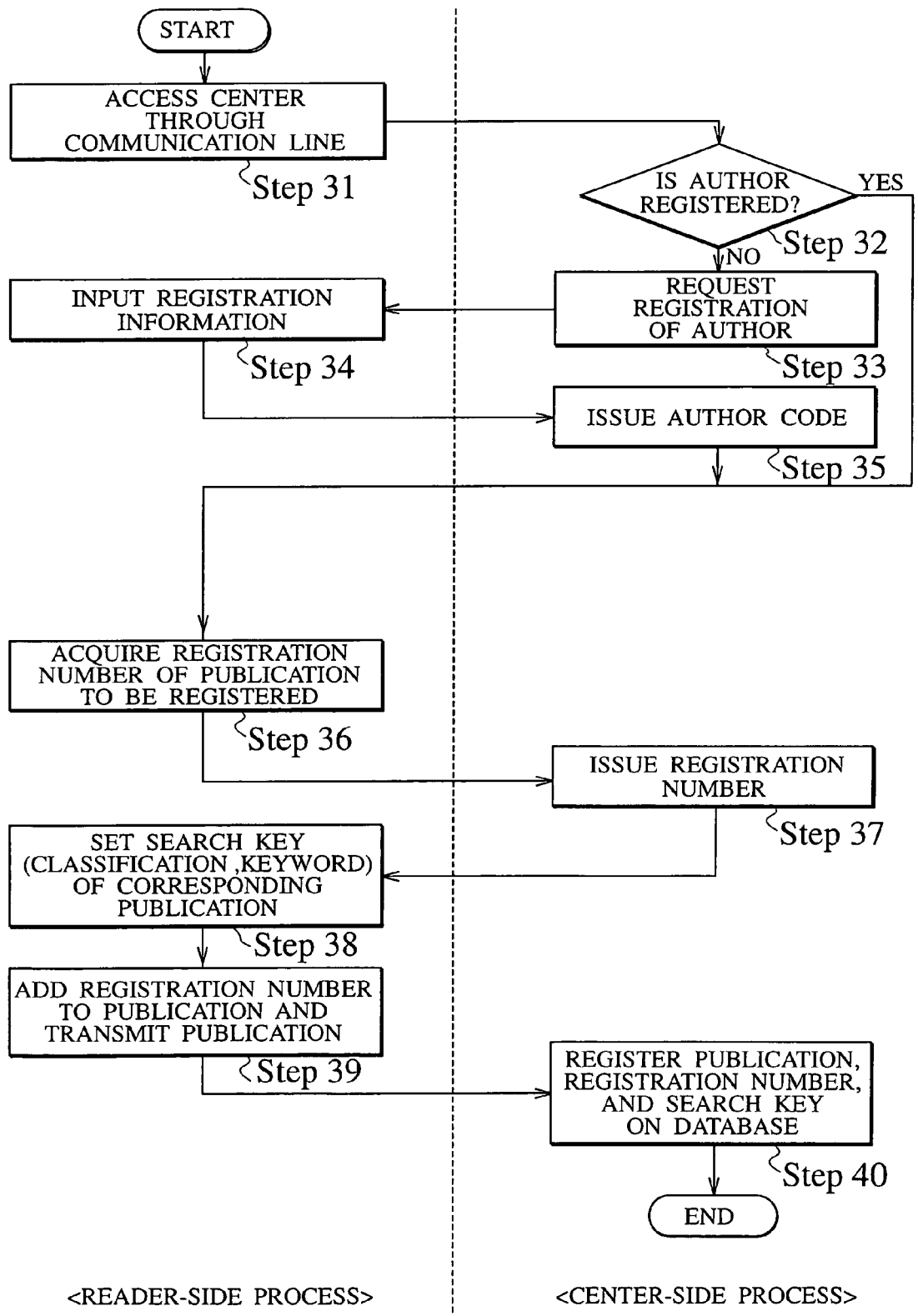
FIG. 4 is a flow chart showing an example of the procedure of a dialogue operation between an author side and a center side in the electronic publication system according to the present invention.
Figure 5:
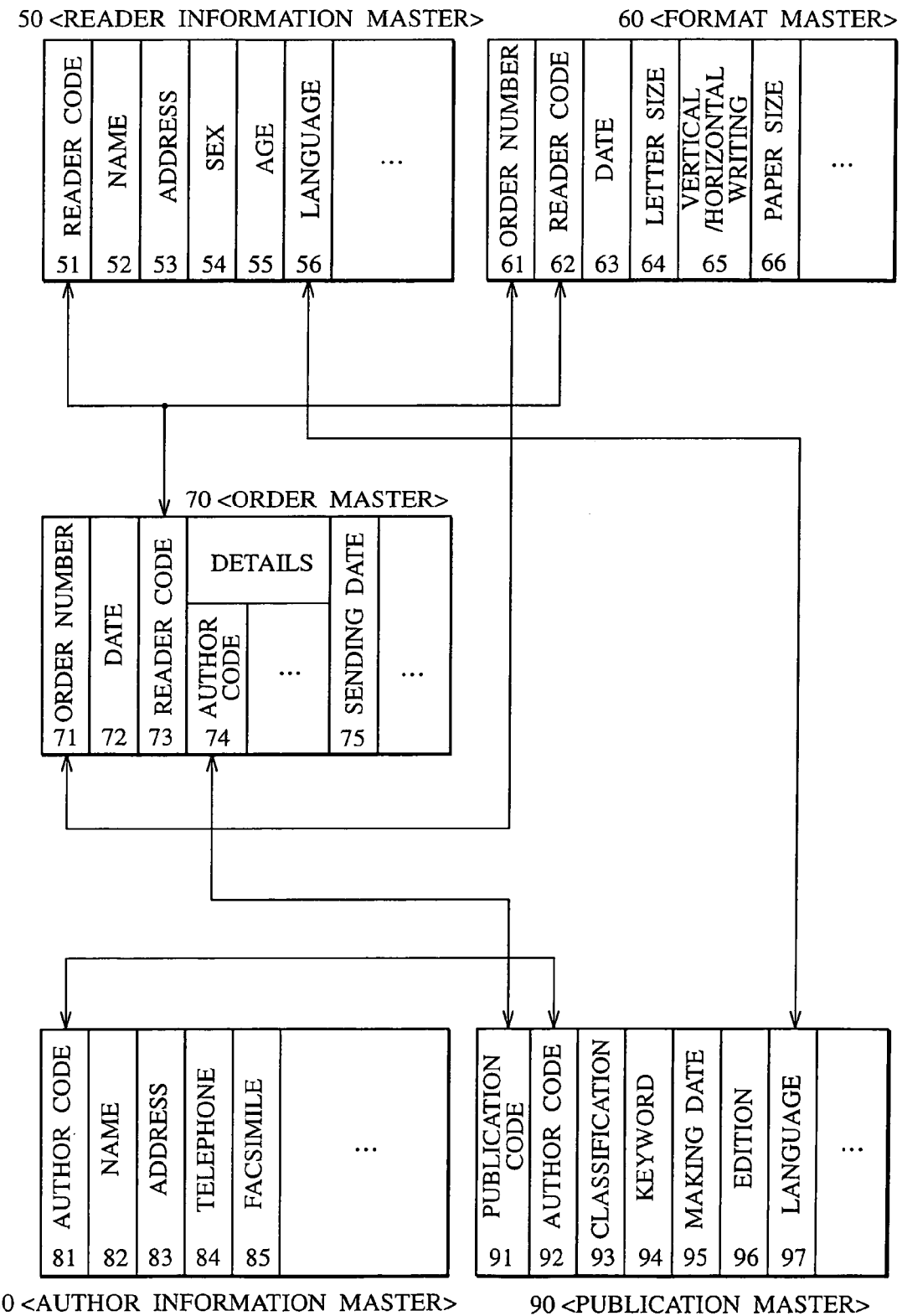
FIG. 5 is a related diagram showing a configuration of a database in the center system shown in FIG. 1.

Examples of the operation of the electronic publication system according to the present invention will be described below by using FIGS. 3 to 5. FIGS. 3 and 4 are flow charts for explaining the examples of the operation, and FIG. 5 is a logical diagram of the database 9 included in the center system 1.

FIG. 3 shows, as a flow chart, an example of dialogue between a reader side (reader system 4) and a center side (center system 1).

When a reader (here, for the sake of descriptive convenience, the reader A is set) uses the reader system 4 to access the center system through the network 10 first (Step 01), the center system 1 checks whether the reader accesses the center system is a registered user or not (step 02). The process of checking whether the reader is a registered user or not can be performed by checking whether the data of the corresponding reader is registered in a reader information master 50 or not.

When the reader A is registered, the flow shifts to an input request process (step 06) of a request. However, when the reader A is not registered, the center system requests the reader A to perform user registration (Step 03). On a display device 42 on the reader A side, for example, a message representing that registration is required to use services of the center is displayed, so as to cause the reader A to input the following items (Step 04).

(1) Name of user
(2) Mail address of user
(3) Sex
(4) Age
(5) Language or the like When the items described above are input by the reader A, the center system 1 issues a reader code for the reader A, and stores the input contents in the reader information master 50 in the database 9 as information for realizing the electronic publication system according to the present invention (Step 05).

The reader A is caused to input the conditions (request contents) of a required writing (Step 06). The items are as follows for example.

(1) Author name
(2) Field
(3) Keyword
(4) Level or the like

The filed includes a rough classification such as computer, biology, or environment to an intermediate or small classification such as C language, gene conversion, or windmill. The keyword is a technical term or the like such as "TCP/IP", "Delphi", or "APEC". The level is a super beginner level, a beginner level, a standard level, a high level, a specialist level, or the like.

The center system 1 performs logical searching such as a logical product (AND) or a logical sum (OR) to a publication master 90 on the basis of these items (Step 07) to constitute an assembly of writings which are necessary for the reader. The center system 1 displays a list consisting of the titles on the display device 42 on the reader side (Step 08). For example, when writings related to the windmill are searched, the list is displayed as shown in FIG. 6.

When the reader A further wants to the outlines of the writings, a summary of a corresponding writing is displayed by clicking the corresponding writing.

The reader A selects necessary writings which are supposed to be useful by the reader A from the list displayed on the display device 42 (e.g., a check box is clicked with a pointing device 41) (Step 09).

As illustrated in FIG. 6, since writings of a plurality of authors are displayed in this list on the basis of a specific classification, the selected writing is written by the plurality of authors. More specifically, this book is a so-called custom-made book edited for only a specific reader.

The compositions made as described above are various depending on the tastes and necessities of readers. If the reader A gives a publication formed on the basis of the knowledge level, necessity, and tastes of the reader A to the reader B who is the third party, or if the reader B who is the third party obtains the publication, the compositions of the publications are not general. For this reason, the publication is too difficult or easy for the reader B, or does not include contents which are necessary for the reader B. The publication is not always useful for the reader B. Therefore, such a book made to order has a function for suppressing the book from being illegally copied.

In the electronic publication system according to the present invention, original data are variously classified in units of small ranges, i.e., articles of a magazine, sections or chapters of a book and then registered in a database. Therefore, since the reader A can select necessary articles from the writings which are necessary for the reader A, the reader A need not purchase many books including overlapping contents unlike a conventional system, a necessary economic load is minimized. Even though an author does not write an original having a large volume such as a book at once, the author may write small themes such as articles of a magazine, gives classifications and keywords to the written parts of the original to register the parts.

Subsequently, an input screen of an output format is displayed on the display device 42 of the reader A. Here, the reader inputs format information which should be used when these writings are printed (Step 10). The input format information includes the following items, for example.

(1) Size of letter
(2) Horizontal writing/vertical writing
(3) Paper size
(4) Start page number
(5) Title
(6) Presence/absence of pronunciation
(7) Presence/absence of print of page number The pieces of input format information are stored in a format master 60 in the database 9 of the center system 1 and managed every readers. When the same format is used for the next time, a format setting is ended by one click operation, and the format may be changed into another format.

By the above operation, the request (order) from the reader system 4 through the network is completed. The center system 1 performs a dynamic edition process for writings on the basis of these pieces of information to form a publication for the reader A.

The assembly of text data of the corresponding writings is constituted. More specifically, the following process is performed. That is, writings selected by the reader A are extracted from the publication master 90 stored in the center system 1, and extracted files are combined to each other to form one file (Step 11). This process may be performed by a tagged text such as HTML, XML, TeX, or the like. An edition performed by TeX is shown in FIG. 7. It is assumed that the reader A selects the first and fourth writing data from the list shown in FIG. 6.

Subsequently, on the basis of the format information input by the reader, a format setting is performed to the constituted writing data. A setting performed by TeX is shown in FIG. 8.

The example shown in FIG. 8 designates "letter size is 12 points, and vertical writing".

Figure 9:
FIG. 9 is an image showing an example obtained by performing a conversion process for a reader information variable in a writing by the center system.

When an author inserts a reader information variable into an article of writing, the conversion process of the reader information variable is performed (Step 13). The reader information variable is expressed as, e.g., "% reader name %", and is to replace the variable with information unique to the reader in the reader information master 50. In this specification, the variable is called a reader information variable. For example, when the name of the reader A is "Yamada Taro", the conversion is performed as shown in FIG. 9.

In this manner, the contents and composition of a book are determined, and this book is just a publication (dedicated to the reader A) unique to the reader A which orders the publication. More specifically, the publication having a composition edited on the basis of conditions desired by the reader A is not always useful for the reader B who is the third party. The publication in which several pieces of personal information of the reader A are incorporated by the reader information variable is useful for only the reader A herself/himself. Therefore, even though this publication can be easily copied, it is hardly possible that the reader A illegally gives the third party (e.g., the reader B), and it is hardly possible that the third party tries to illegally obtain the publication. In addition, if the publication is illegally copied, the reader A who is the owner of the copy source can be found on the basis of the contents of the several pieces of personal information incorporated in the articles.

The composition and contents conforming to the order contents of the reader A are embodied as described above, the center system 1 performs file conversion to original data to send the original data to a user (Step 14). As a concrete example, Tex is started to perform compiling and to form a dvi file. In addition, the dvi file is converted into a Postscript file by a file converter such as dvips or the like.

The formed postscript file is converted into a PDF file by converter software such as Acrobat Distiller. The PDF file is transferred to a transmission folder (not shown) in the center system 1. The PDF file formed as described above is added with a file name unique to each reader who is an owner.

The center system 1 monitors a transmitted folder in a predetermined cycle, and transmits the formed PDF file to the reader system 4.

The above operation is an operation performed from the order made by the reader to the distribution of the publication.

An example of dialogue between an author aide (author system 2) and a center side (center system 1) will be described below with reference to FIG. 4.

When an author (here, for the sake of descriptive convenience, an author A is set) uses the author system 2 to access the center system through the network 10 (Step 31), the center system 1 checks whether the author A accesses the center system is a registered author or not (step 32). The process of checking whether the author is a registered author or not can be performed by checking whether the data of the corresponding author A is registered in the author information master 80 or not.

When the author A is registered, the flow shifts to a process of acquiring a registration number (step 36). However, when the author A is not registered, the center system requests the author A to perform author registration (Step 33). On a display device 42 on the author A side, for example, a message representing that author registration is required to register a writing in the center is displayed, so as to cause the author A to input the following items (Step 34).

(1) Name of author
(2) Mail address of author
(3) Telephone number
(4) Facsimile number or the like When the items described above are input by the author A, the center system 1 issues an author code for the author A, and stores the input contents in the author information master 80 in the database 9 as information for realizing the electronic publication system according to the present invention (Step 35).

The author A requests of the center system 1 that the author A wants to acquire the registration number (this serves as a publication code) of a publication (writing data) to be registered (Step 36). In contrast to this, the center system 1 employs the registration number to notify the author A of the number (Step 37).

The author A sets a classification or a keyword as a search key for the publication (Step 38). In addition, the registration number and the search key are added to the publication (writing data), and the publication (writing data) is transmitted to the center system 1 (Step 39).

The center system 1 which receives the writing stores the writing, the registration number, the search key, and the like in the publication master 90 in the database 9.

By the above operation, the dialogue process between the author system 2 and the center system 1 can be automated to some extent by a dialogue process program.

Although an editor is not interposed in the flow of the writing registration process described above, the editor or a designer also importantly functions in the electronic publication system according to the present invention. As described above, the embodiment using a tagged script language (e.g., HTML, XML, TeX, or the like) is illustrated. However, a Plain Text transmitted from the author system 2 to the center system 1 can also be automatically processed to form a tagged script language. However, there are many parts such as a peculiar layout which cannot be mechanically processed. An editor must process these parts by using the editor system 3.

Furthermore, graphic data such as a picture, an illustration, and a binding cannot be mechanically formed. For this reason, the designer must process the graphic data by using the editor system 3.

In addition, when original data is processed by an editor, additional values such as check of contents or the name of a famous editor can be added to writing.

Second Embodiment

The first embodiment explains an example in which books such as a book and a magazine are published. However, the technical spirit according to the present invention is not limited to books, and can also be applied to an example in which digital contents which creatively expresses spirits and emotions such as music, fine arts, movies, and computer programs are published.

When music software is exemplified, the music software is subjected to various classifications (e.g., a composer, a player, a genre, or the like) in units of names of pieces of music to be registered in a database. A purchaser can select a necessary piece of music according to the taste and directivity of the purchaser from pieces of music registered for the purchaser. For this reason, since the purchaser need not purchase many music albums on which overlapping pieces of music are recorded unlike a conventional system, a necessary economic load is minimized. On an author side, when the names of many pieces of music are not formed at once for an album, classifications and keywords may be added to formed pieces of music in the order of formation to be registered.

The center system which receives a purchase request from the purchaser dynamically reedits one music album while incorporating the personal information of the purchaser (e.g., a purchaser name, the address of the purchaser, and the like) to selected music data as narration. As a position in which the personal information is incorporated as narration may be, e.g., the start or end of the album, an interval between pieces of music, and the introduction portion of a piece of music.

In a computer program, for example, the personal information of the purchaser may be incorporated in the start screen or the end screen of the program or the title bar or the status bar of a display window of a GUI (Graphical User Interface).

Figure 10:
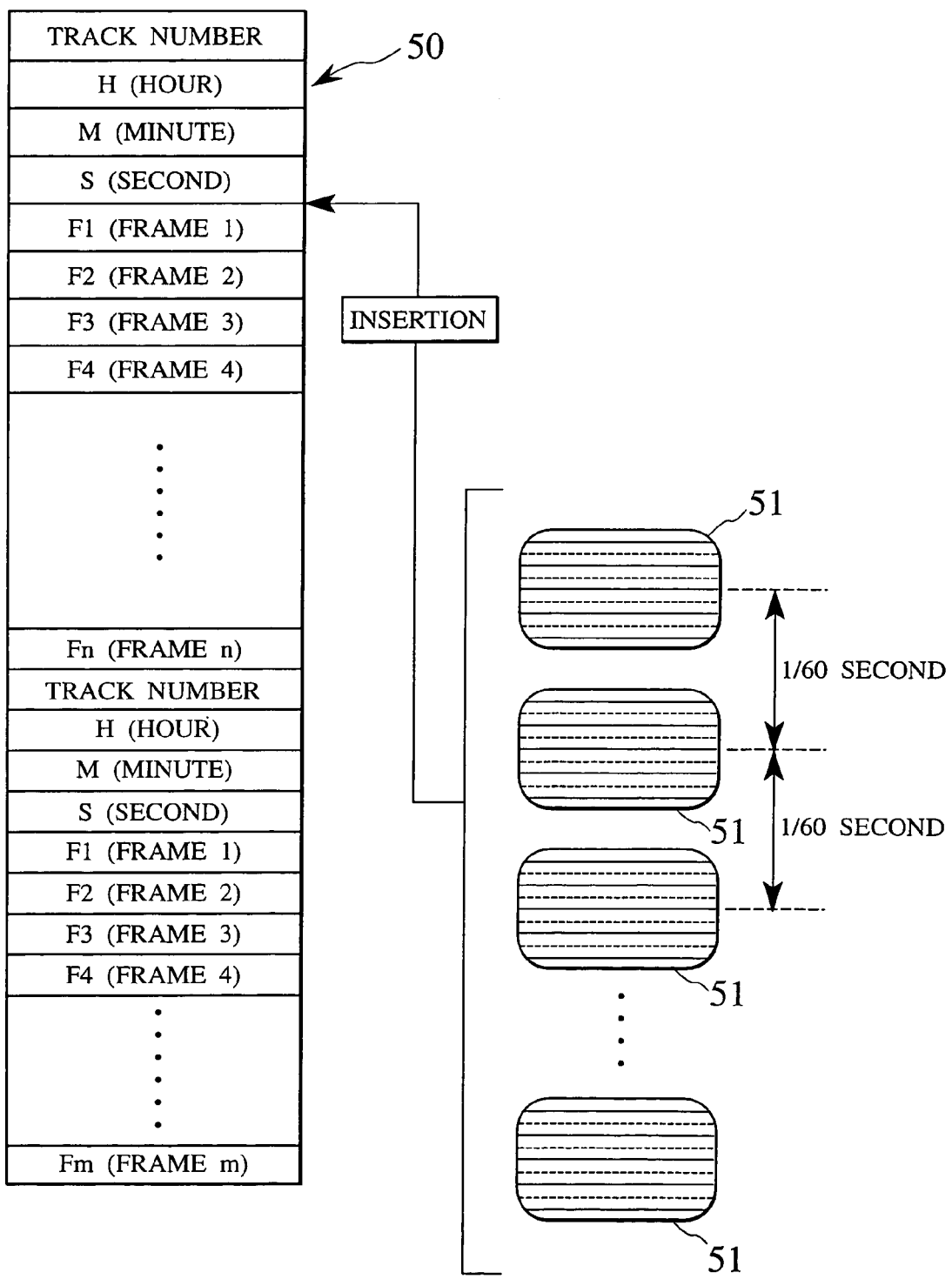
FIG. 10 is an image showing an example in which frame images of the personal information of a purchaser is inserted into writing data constituted by video image data.

FIG. 10 illustrates an example in which a frame 51 for displaying the personal information of a purchaser is inserted into movie data 50 such as a movie or an animation. The movie data 50 is constituted by a track number, a recording time (hour, minute, second) recorded on the track, and frames (F1 to Fn) every track. A predetermined number of frames 51 representing the personal information of the purchaser are inserted into the start portion of the frames. For example, when the personal information of the purchaser is displayed for 10 seconds, 600 frames 51 may be inserted (when the number of frames is 60 per second).

Figure 11:
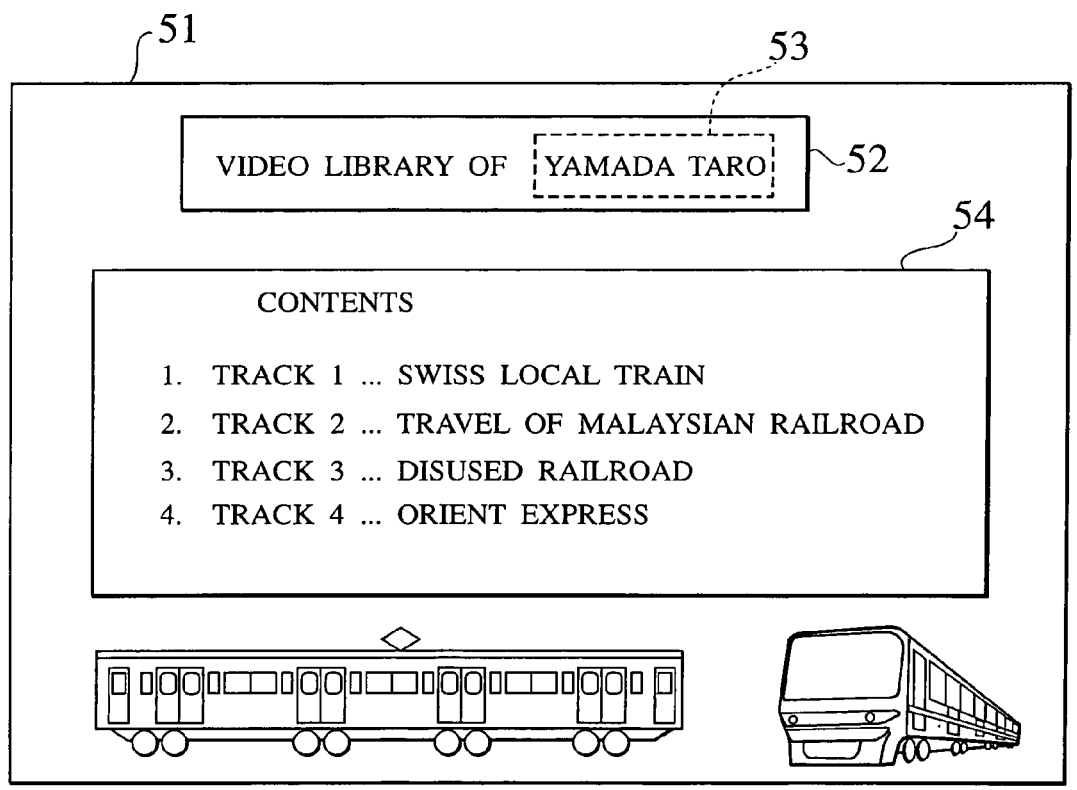
FIG. 11 is an image showing a display layout example of a frame image of the personal information shown in FIG. 10.

FIG. 11 illustrates a layout of the frames 51 representing the personal information of the purchaser. Items displayed on the frame 51 are constituted by a title portion 52 and an index portion 54. As illustrated in FIG. 11, for example, a part of the title portion 52 may be incorporated in an incorporation-type field 53, and the name or the like of the purchaser may be inserted into the field 53.

Although the electric publication system of the present invention have been explained in detail using the first and second embodiment, the present invention is not limited to the embodiments, and various improvements and modification can be made without departing from a subject matter of the invention.

What is claimed is:

1. An electronic publication system comprising:
   a processor;
   a memory coupled to the processor;
   registration means for registering in a publication database writing data, said writing data including a purchaser information variable inserted by an author of said writing data in a publication database;
   a personal data input that registers personal data associated with an individual purchaser;
   a personal contents input that accepts requests for contents of a publication to be provided to the individual purchaser according to the tastes and necessities of the individual purchaser;
   a dynamic re-editing function for dynamically re-editing a composition of the writing data from a group of writing data registered in the publication database, on the basis of contents requested by the individual purchaser; and
   an output configured to:
      provide the re-edited composition of the writing data only to the individual purchaser as an uneditable publication;
      replace the purchaser information variable in the writing data with information unique to the individual purchaser based on the personal data associated with the individual purchaser; and
      including include content dynamically and uniquely edited for the individual purchaser,
   wherein the uniquely edited content serves as a source identifier in order to deter the re-edited composition from being illegally copied, said re-edited composition not containing any copy protection technique,
   wherein said output is further configured to provide the uneditable publication only to the individual purchaser through a network, and
   wherein the dynamically re-edited composition renders the uneditable publication as a unique publication in a manner so as to include the personal contents identifying the individual purchaser, such that reproduction of the uneditable publication carries personal data associated with the individual purchaser in a manner that discourages distribution by the individual purchaser and discourages receipt by a third party.

2. The electronic publication system according to claim 1, wherein the contents requested by the individual purchaser are at least one piece of data selected from a group consisting of an author name, a field, a keyword, and a level.

3. The electronic publication system according to claim 1, wherein the personal information of the individual purchaser is name data of a corresponding reader.

4. The electronic publication system according to claim 1, wherein the writing data is book data constituted by character data.

5. The electronic publication system according to claim 4, wherein the book data includes image data.

6. The electronic publication system according to claim 4, wherein the registration means registers writing data in the publication database in units of articles, and re-edits the writing data in units of articles.

7. The electronic publication system according to claim 1, wherein the writing data is constituted by at least one piece of data selected from a group consisting of movie data, still image data, and audio data.

8. The electronic publication system according to claim 1, wherein the writing data is music data.

9. The electronic publication system according to claim 1, wherein the writing data is a computer program.

10. An electronic publication system comprising:

a processor;

a memory coupled to the processor;

registration means for registering in a publication database writing data, said writing data including a purchaser information variable inserted by an author of said writing data;

a personal data input that registers personal data associated with an individual purchaser and that accepts requests for contents of a publication to be provided to the individual purchaser according to the tastes and necessities of the individual purchaser;

a dynamic editing function for dynamically editing a composition of the writing data on the basis of contents requested by the individual purchaser and dynamically re-editing the contents of the writing data to include therein personal information of the purchaser, from a group of writing data registered in the publication database; and an output configured to:

provide the edited composition of writing data only to the purchaser as an uneditable publication;

replace the purchaser information variable in the writing data with information unique to the individual purchaser based on the personal data associated with the individual purchaser; and include content dynamically and uniquely edited for the individual purchaser, wherein the uniquely edited content serves as a source identifier in order to deter the re-edited contents from being illegally copied, said re-edited contents not containing any copy protection technique, wherein said output is further configured to provide the uneditable publication only to the individual purchaser through a network, and wherein the dynamically re-edited contents renders the uneditable publication as a unique publication in a manner so as to include the personal contents identifying the individual purchaser, such that reproduction of the uneditable publication carries personal data associated with the individual purchaser in a manner that discourages distribution by the individual purchaser and discourages receipt by a third party.

11. The electronic publication system according to claim 10, wherein the contents requested by the individual purchaser are at least one piece of data selected from a group consisting of an author name, a field, a keyword, and a level.

12. The electronic publication system according to claim 10, wherein the personal information of the individual purchaser is name data of a corresponding reader.

13. The electronic publication system according to claim 10, wherein the writing data is book data constituted by character data.

14. The electronic publication system according to claim 13, wherein the book data includes image data.

15. The electronic publication system according to claim 13, wherein the registration means registers writing data in the publication database in units of articles, and re-edits the writing data in units of articles.

16. The electronic publication system according to claim 10, wherein the writing data is constituted by at least one piece of data selected from a group consisting of movie data, still image data, and audio data.

* * * * *